Dec. 8, 1931.  C. A. PECH ET AL  1,835,964
POULTRY FOUNT
Filed July 12, 1930
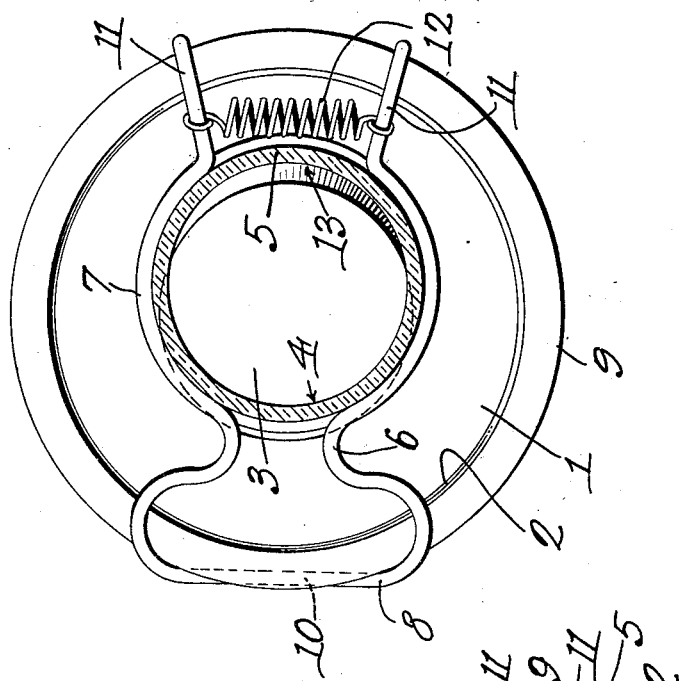
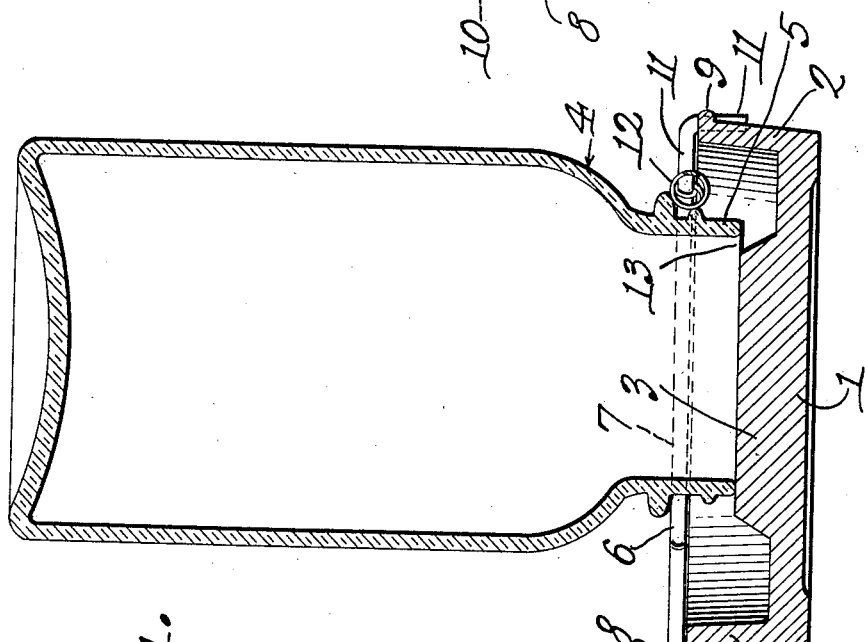
C. A. Pech and
B. B. Root
Inventors
By C. A. Snow & Co.
Attorneys.

Patented Dec. 8, 1931

1,835,964

UNITED STATES PATENT OFFICE

CHARLES ARTHUR PECH AND BUELL B. ROOT, OF MACOMB, ILLINOIS

POULTRY FOUNT

Application filed July 12, 1930. Serial No. 467,563.

This invention relates to a fount for use by poultry.

One of the objects is to provide a pottery base with which can be used an ordinary fruit jar such as a "Mason", the base being of such design as to prevent spilling of the contents of the jar while the fount is being inverted for use.

Another object is to provide a base which can be made easily and cheaply, can be cleaned readily, and will automatically control the flow of fluid thereinto from the jar.

A further object is to use a pottery base which will resist the action of acids or chemicals and keep the fluid in good condition at all times.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:

Figure 1 is a vertical section through the fount.

Figure 2 is a horizontal section.

Referring to the figures by characters of reference, 1 designates a pottery base preferably glazed and of any desired contour though it is best to use a circular one. This base is moulded with an upstanding rim 2 forming a saucer. Formed on the top face of the base is a circular boss 3 the top of which is flat and located below the plane of the top edge of rim 2.

A "Mason" fruit jar 4 or the like is adapted to be supported in an inverted position on boss 3 and the neck portion 5 thereof is gripped by a wire clip 6. This clip has opposed bowed jaws 7 connected at one end by a yoke 8 which is offset downwardly to engage under a bead 9 on rim 2 as shown at 10.

The other ends of the jaws have angular arms 11 for gripping the bead 9 and a spring 12 connects the arms to hold the jaws in engagement with the neck of jar 4 and to maintain yoke 8 and arms 11 in engagement with bead 9.

When the parts are assembled as described the open end of jar 4 rests on boss 3 but is held slightly off center. Thus the jar will be provided with an arcuate or crescent-shaped outlet 13 through which the liquid contents of the inverted jar can flow to the saucer until the level thereof reaches the outlet whereupon the discharge will be stopped.

It will be seen that this structure is durable, can be easily and cheaply made, and is readily cleaned. There are no apertures for the accumulation of dirt and germs, and the only metal used is located where it will not touch the liquid used. Thus buttermilk and other fluids containing acids, etc., can be used with no danger of poisonous reactions due to corrosion, etc.

What is claimed is:

A fount including a base of pottery forming a saucer having a central boss provided with a flat top in a plane below the top of the saucer, an inverted liquid container resting on the boss, and means embracing said container and detachably engaging the margin of the saucer at any point for holding the container off center on the boss to provide a relatively small arcuate outlet formed of a portion of the open end of the container projecting beyond the boss.

In testimony that we claim the foregoing as our own, we have hereto affixed our signatures.

CHARLES ARTHUR PECH.
BUELL B. ROOT.